United States Patent [19]
Chang et al.

[11] Patent Number: 5,635,858
[45] Date of Patent: Jun. 3, 1997

[54] ZERO-STOPPING INCREMENTERS

[75] Inventors: Chin-An Chang, Peekskill; Sang H. Dhong, Mahopac, both of N.Y.

[73] Assignee: International Business Machines, Corporation, Armonk, N.Y.

[21] Appl. No.: 476,299

[22] Filed: Jun. 7, 1995

[51] Int. Cl.$^6$ .............................. H03K 19/21; G06F 7/50
[52] U.S. Cl. .............................................. 326/53; 364/770
[58] Field of Search .................... 326/53; 364/747, 364/768, 770, 784

[56] References Cited

U.S. PATENT DOCUMENTS

| | | | |
|---|---|---|---|
| 4,153,939 | 5/1979 | Kudou | 364/770 |
| 4,276,607 | 6/1981 | Wong | 364/760 |
| 4,417,315 | 11/1983 | Russell | 364/770 |
| 4,700,325 | 10/1987 | Ware | 364/770 |
| 4,713,790 | 12/1987 | Kloker et al. | 326/53 |
| 4,922,446 | 5/1990 | Zurawski et al. | 364/748 |
| 4,926,370 | 5/1990 | Brown et al. | 364/748 |
| 4,977,534 | 12/1990 | Takahashi | 364/748 |
| 4,984,151 | 1/1991 | Dujari | 364/200 |
| 5,027,308 | 6/1991 | Sit et al. | 364/748 |
| 5,222,037 | 6/1993 | Taniquchi | 364/748 |
| 5,258,943 | 11/1993 | Gamez et al. | 364/745 |
| 5,317,527 | 5/1994 | Britton et al. | 364/715.04 |
| 5,384,724 | 1/1995 | Jagini | 364/770 |
| 5,504,698 | 4/1996 | Su | 364/770 |

*Primary Examiner*—Edward P. Westin
*Assistant Examiner*—Richard Roseen
*Attorney, Agent, or Firm*—Whitham, Curtis, Whitham & McGinn; Robert P. Tassinari, Jr.

[57] ABSTRACT

A zero-stopping incrementer operates on the recognition that half of all digital values that require incrementing will be even numbers; that is, the least significant bit (LSB) is a binary "0". Incrementing such a number merely requires changing the LSB from a binary "0" to a binary "1". For odd numbers (i.e., those where the LSB is a binary "1"), the zero-stopping incrementer searches for the first binary "0" beginning with the LSB. Once found, that binary "0" is changed to a binary "1" and all the binary "1s" preceding it are changed to binary "0s". No change is required to the higher order bits following the first binary "0". This operation is very fast, the worst case being the case when all the binary bits of the number to be incremented are "1s". Nevertheless, the process is significantly increased, especially for 64-bit numbers which are processed by modern superscalar microprocessors. As compared with conventional incrementers using an adder-like scheme, the zero-stopping incrementer is about three times faster with power consumption less than half of the conventional incrementers.

5 Claims, 3 Drawing Sheets

ZERO-STOPPING INCREMENTERS

BACKGROUND OF THE INVENTION

1. Field of the Invention

The present invention generally relates to incrementers for use in digital applications and, more particularly, to very high speed incrementers having particular application in the central processor unit (CPU) of digital computers and especially microprocessors.

2. Background Description

There are many hardware and software related operations that require an incrementer to generate a digital value which is increased by one over a previous digital value. For example, in the process of accessing instructions in sequential order, an incrementer is required to generate instruction addresses. This function is often performed by a program counter; however, in the execution of a complex program, there are many branch instructions requiring a current instruction address to be temporarily stored. Then, when the program resumes at the stored instruction address, it is necessary to reload the program counter and advance the count. This function is often performed by an adder, but in either case, there can be a significant delay due to the ripple of the count through the counter or adder.

This is but one of many applications in digital computing and control technologies requiring an incrementer. While many digital circuits have been significantly improved in performance, not much attention has been given in the past to the function of the incrementer.

SUMMARY OF THE INVENTION

It is therefore an object of the present invention to provide an incrementer which exhibits improved performance over prior incrementers, thereby complementing the high performance of modern digital circuitry.

It is another object of the invention to provide a high speed incrementer for high performance microprocessors which has reduced power consumption.

According to the invention, a zero-stopping incrementer operates first of all on the recognition that half of all digital values that require incrementing will be even numbers; that is, the least significant bit (LSB) is a binary "0". Incrementing such a number merely requires changing the LSB from a binary "0" to a binary "1". For odd numbers (i.e., those where the LSB is a binary "1"), the zero-stopping incrementer according to the invention searches for the first binary "0" beginning with the LSB. Once found, that binary "0" is changed to a binary "1" and all the binary "1s" preceding it are changed to binary "0s". No change is required to the higher order bits following the first binary "0". This operation is very fast, the worst case being the case when all the binary bits of the number to be incremented are "1s". Nevertheless, the process is significantly increased, especially for 64-bit numbers which are processed by modern superscalar microprocessors. As compared with conventional incrementers using an adder-like scheme, the zero-stopping incrementer is about three times faster with power consumption less than half of the conventional incrementers.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
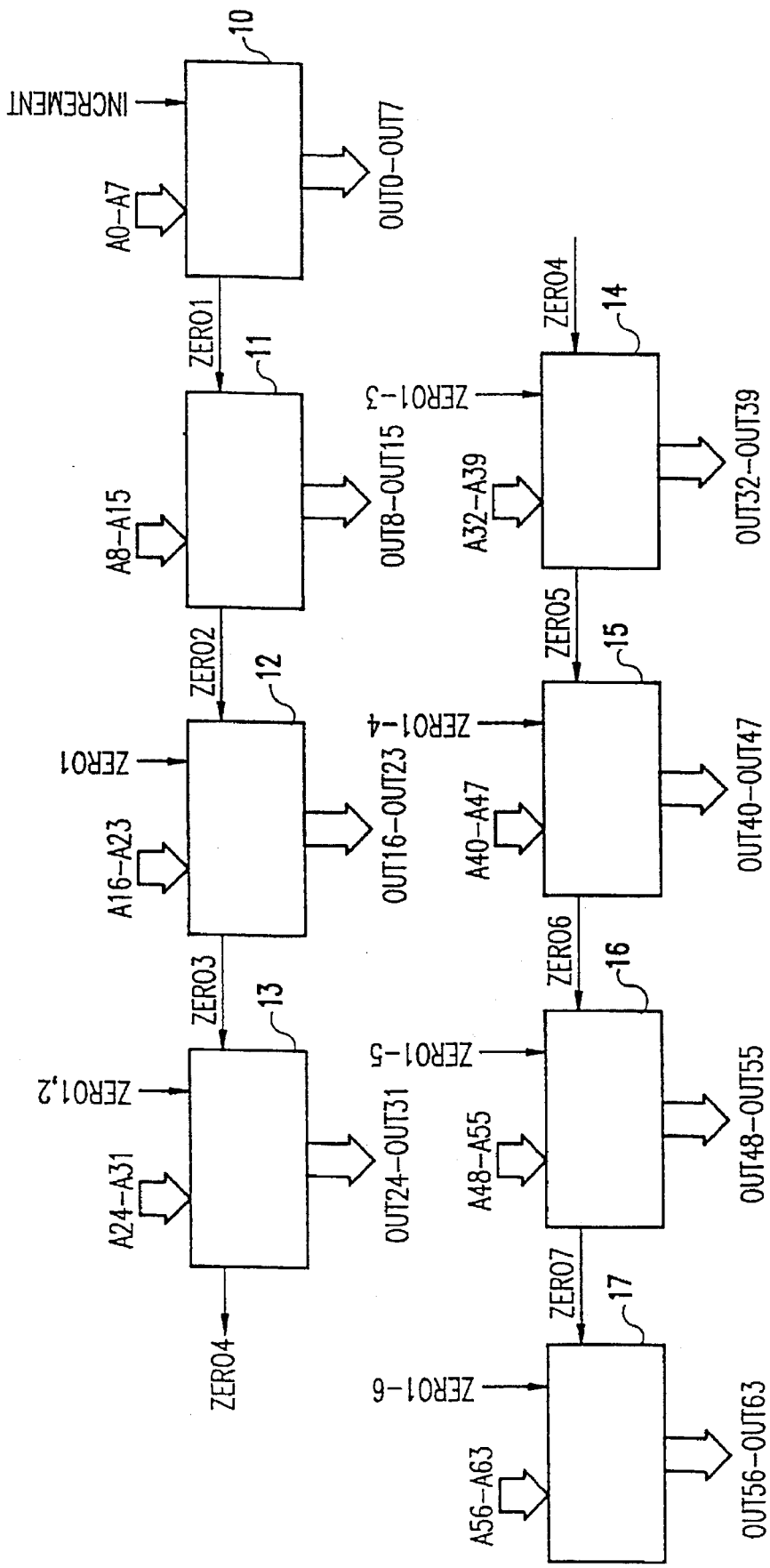
FIG. 1 is block diagram of showing eight 8-bit zero-stopping incrementers assembled to be a 64-bit zero-stopping incrementer according to a preferred embodiment of the invention.

Referring now to the drawings, and more particularly to FIG. 1, there is shown a block diagram of a 64-bit zero-stopping incrementer according to a preferred embodiment of the invention. This incrementer is divided into eight 8-bit blocks 10 to 17, starting from the least significant bits (LSBs) 0–7. In addition to receiving the first eight bits, 0–7, the incrementer block 10 also receives an INCREMENT input. The block 10 generates the outputs, OUT0–OUT7, and a zero detection output, ZERO1. The ZERO1 output indicates whether a logic "0" was detected in the first eight bits, 0–7. The next block 11 receives the next eight LSBs, 8–15, but instead of an INCREMENT input, this block receives the ZERO1 output of block 10 as an input. The ZERO1 output of block 10 is also supplied to the subsequent blocks 12 to 17, the ZERO2 output from block 11 is supplied to blocks 12 to 17, and so forth. Thus, each block receives an input indicating whether a logic "0" was detected in any of the bits of any of the preceding blocks. Where more than one ZERO input is received by a block, the several ZERO inputs are ORed together. The next blocks 12 to 17 are similar to block 11 except that block 17, the last block in the series, does not provide a zero detection output.

Figure 2:
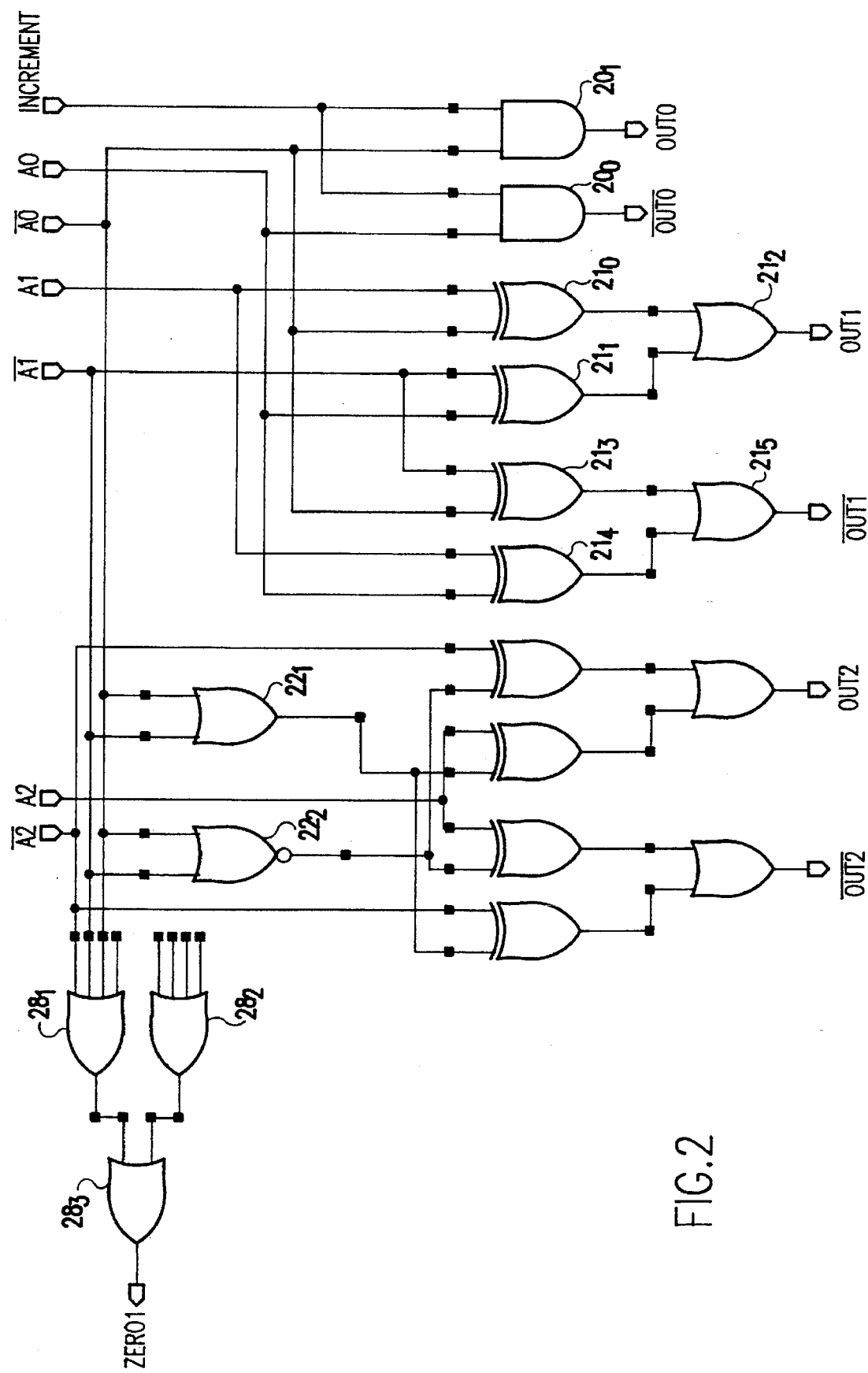
FIG. 2 is a logic diagram of the first 8-bit zero-stopping incrementer for the least significant bits s(LSBs) 0 to 7.

FIG. 2 shows the logic of the first 8-bit block 10 for the first eight LSBs. For the sake of simplicity, only the logic for the first three bits A0 to A2, is shown, but those skilled in the art will understand from this description the logic for the next five bits, A3 to A7. In FIG. 2, the inputs of the 0th bit and its complement, A0 and $\overline{A0}$, respectively, are supplied to AND gates $20_0$ and $20_1$. These AND gates also receive the INCREMENT input. Since A0 is supplied to AND gate $20_0$ and $\overline{A0}$ is supplied to AND gate $20_1$, the inputs A0 and $\overline{A0}$ reverse their values in the outputs OUT0 and $\overline{OUT0}$, upon ANDing with the INCREMENT input. The next LSB bit, A1 and $\overline{A1}$, produces the outputs using two four-input exclusive OR (XOR) gate, the first being composed of two two-input XOR gates $21_0$ and $21_1$ and an OR gate $22_2$ and the second being composed of two two-input XOR gates $22_3$ and $22_4$ and an OR gate $22_5$. The XOR gate $21_0$ receives as its inputs A1 and $\overline{A0}$, while the XOR gate $21_1$ receives as its inputs $\overline{A1}$ and A0. The XOR gate $21_3$ receives as its inputs $\overline{A1}$ and $\overline{A0}$, while the XOR gate $21_4$ receives as its inputs A1 and A0. The logic allows a dependence of the outputs, OUT1 and $\overline{OUT1}$, on whether A0 is a logic "0" or a logic "1". For A0 being a logic "0", OUT1 remains unchanged from A1, and OUT1 unchanged from $\overline{A1}$. If no zero is detected, i.e., A0 is a logic "1", OUT1 takes the value of $\overline{A1}$, and $\overline{OUT1}$ the value of A1. Similarly, the next LSB, A2 and $\overline{A2}$, produce outputs OUT2 and $\overline{OUT2}$ depending on whether any zero is detected from the previous bits. This bit starts with a two-input OR gate $22_1$ and a two-input NOR gate $22_2$, each receiving as inputs $\overline{A0}$ and $\overline{A1}$. These gates detect whether either of the inputs $\overline{A0}$ or $\overline{A1}$ are a logic "0". This information is then fed to the eight-input XOR gate that determines the states of the outputs of this bit.

Also partially shown at the upper left corner of FIG. 2 is an eight-input OR gate, composed of two four-input OR gates $28_1$ and $28_2$ followed by a two-input OR gate $28_3$. The inputs to this OR gate are the complements of all the eight bits of this block, providing information of a zero bit in this 8-bit block. As mentioned, the output of the eight-input OR gate is used in all the following blocks 12 to 17 shown in FIG. 1.

Figure 3:
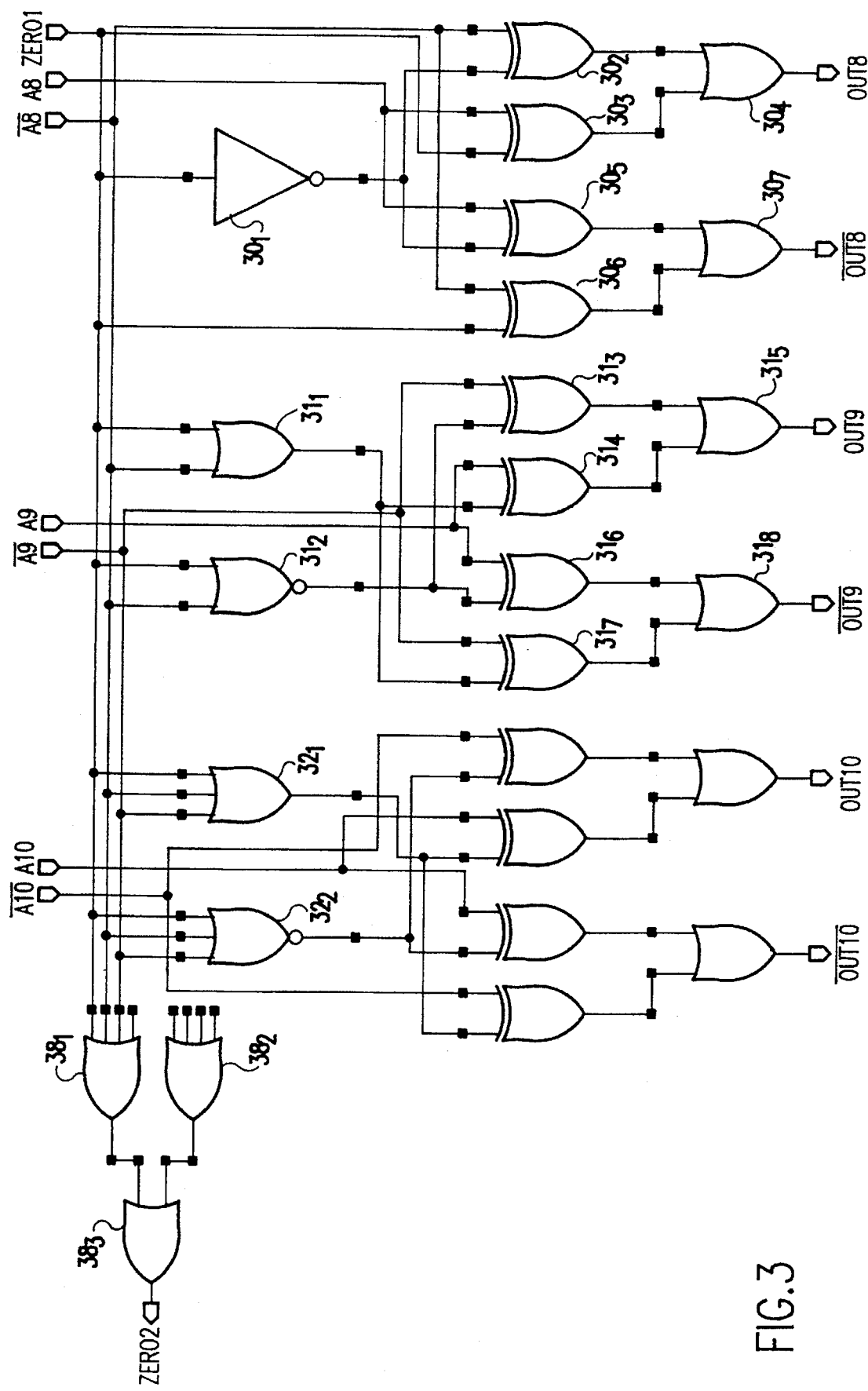
FIG. 3 is a logic diagram of the next and succeeding 8-bit zero stopping incrementers used in the 64-bit zero-stopping incrementer shown in FIG. 1.

Then next block of eight LSBs, A8–A15, are input to the block shown in FIG. 3. Again, only the logic for the first three bits A8 to A10, is shown, but those skilled in the art will understand from this description the logic for the next five bits, A11 to A15. In FIG. 3, he ZERO1 output from OR gate $28_3$, shown in FIG. 2, and its complement, $\overline{ZERO1}$, generated by inverter $30_1$, are input to two four-input XOR gates, the first being composed of two two-input XOR gates $30_2$ and $30_3$ and an OR gate $30_4$ and the second being composed of two two-input XOR gates $30_5$ and $30_6$ and an OR gate $30_7$. Here, the first bit, A8, takes into concern whether the ZERO1 input is a logic "1" or a logic "0", indicating the presence or absence of a zero bit, respectively, in the previous block of eight bits. Without any zero from the previous block, the outputs OUT8 and $\overline{OUT8}$ take the values $\overline{A8}$ and A8, respectively. However, if the ZERO1 input is a logic "1", indicating a zero bit is present in the previous block of eight bits, the outputs take the same values as their inputs, with OUT8 being the same as A8 and $\overline{OUT8}$ being the same as $\overline{A8}$. The next bit, A9, of this block starts with a two-input OR gate $31_1$ and a two-input NOR gate $31_2$ to detect zero values from the ZERO1 input and A8. The information is then fed into two four-input XOR gates, the first being composed of two two-input XOR gates $31_3$ and $31_4$ and an OR gate $31_5$ and the second being composed of two two-input XOR gates $31_6$ and $31_7$ and an OR gate $31_8$, to determine the states of the outputs of this bit. Similarly, a three-input OR gate $32_1$ and a three-input NOR gate $32_2$ are used for the next higher bit, A10 and $\overline{A10}$, and so forth. The ZERO2 output is generated by the eight-input OR gate composed of two four-input OR gates $38_1$ and $38_2$ and two-input OR gate $38_3$.

FIGS. 2 and 3 illustrate the concept and building blocks of the first sixteen bits of the 64-bit zero-stopping incrementer shown in FIG. 1 according to a preferred embodiment of the invention. The remaining blocks of the incrementer are similar to that of FIG. 3. Block 12 includes a two-input OR gate to combine the ZERO1 and ZERO2 inputs, block 13 includes a three-input OR gate to combine the ZERO1, ZERO2 and ZERO3 inputs, and so forth. Obviously, an incrementer of less than or greater than sixty-four bits may be made using the blocks of FIGS. 2 and 3. Conventional integrated circuit (IC) technology can be used to implement the zero-stopping incrementer. Customized circuits can be used to optimize the speed and space as required, depending on individual needs of each application. With several stages for zero checking and converting the logic "1is" to logic "0s", as described above, delays in several hundreds picoseconds are possible, instead of those in the nanosecond range for the incrementers using the adder-like approaches of the prior art.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A zero-stopping incrementer comprising:
   input means for inputting a binary number to be incremented by one;
   an increment control for supplying an increment signal to cause said binary number to be incremented by one;
   first logic means for detecting a first logic zero in said binary number beginning with a least significant bit of said binary number;
   second logic means for converting said first logic zero to a logic one and converting all bits below said first logic zero, if any, to logic zeros; and
   third logic means for passing all bits of said binary number above said first logic zero.

2. The zero-stopping incrementer recited in claim 1 wherein said incrementer is divided into a plurality of blocks, each said block receiving a predetermined number of bits of said binary number, and wherein said first logic means includes an OR gate in each said block connected to receive complements of the bits received by the block to generate a zero detecting signal for that block.

3. The zero-stopping incrementer recited in claim 2 wherein a first of said blocks receives the least significant bits (LSBs) of the binary number and said increment signal and each subsequent one of said blocks receives the zero detecting signal from each preceding block.

4. The zero-stopping incrementer recited in claim 3 wherein the second logic means includes ANDing means for reversing the logic values of the least significant bit (LSB) as a first output of said incrementer in the first of said blocks in response to said increment signal.

5. The zero-stopping incrementer recited in claim 4 wherein the second logic means includes exclusive OR means for controlling all outputs, except said first output, of the incrementer in dependence on whether a preceding input is a logic "1" or a logic "0".

\* \* \* \* \*